US005974000A

United States Patent [19]

Pfeil

[11] Patent Number: 5,974,000

[45] Date of Patent: Oct. 26, 1999

[54] TACTILE ACTUATED ELECTRONIC COMPUTER WRIST WATCH

[76] Inventor: William Pfeil, Molokai Ag Park, Box #317, Kaunakakai, Hi. 96748

[21] Appl. No.: 09/243,540

[22] Filed: Feb. 3, 1999

Related U.S. Application Data

[63] Continuation-in-part of application No. 09/050,100, Mar. 30, 1998, Pat. No. 5,878,002.

[51] Int. Cl.[6] .......................... G04B 47/00; G04C 17/00; G04C 19/00; G06F 3/00

[52] U.S. Cl. ................................ 368/10; 368/69; 368/82; 364/705.07; 364/709.11

[58] Field of Search ................................ 368/10, 69, 70, 368/82, 239, 185–187; 364/705.01, 705.07, 709.01, 709.11, 710.01

[56] References Cited

U.S. PATENT DOCUMENTS

| | | |
|---|---|---|
| 3,803,834 | 4/1974 | Reese . |
| 4,022,014 | 5/1977 | Lounenslager . |
| 4,044,242 | 8/1977 | Laesser . |
| 4,232,582 | 11/1980 | Heinsen et al. . |
| 4,240,150 | 12/1980 | Ebihara et al. . |
| 4,266,278 | 5/1981 | Ebihara et al. . |
| 4,268,913 | 5/1981 | Nakagiri et al. . |
| 4,300,201 | 11/1981 | Maeda et al. . |
| 4,552,464 | 11/1985 | Rogers . |

*Primary Examiner*—Vit Miska
*Attorney, Agent, or Firm*—Barnes & Thornburg

[57] ABSTRACT

A tactilely setable data input structure for a battery-operated, computer-run wrist watch operable in a time mode, a calculator mode and an alphabetic mode comprising a watch casing housing a battery and clock calculator electronics and at least one visible display having multiple units therein. A first button is located on a first side edge of the housing for operating the electronics to cause the visible display to shift between a calculator, alphabetic and a time display upon depression thereof. Further, buttons about the periphery of the watch or watch band are provided. Pressing different combinations of these buttons cause the electronics to create digits zero through nine or alphabetics in a first unit of the display dependent on the combination of specific buttons simultaneously pressed. Multiple entry of digits or alphabetics into the subsequent units of the display allow for creation of multi-digit numbers and words. The numbers created can be used to set time or run normal arithmetic calculator functions. The created words can be stored in a memory in the watch and later downloaded to a computer for creating letters or E-mails, or can provide an internal address book in a watch memory. An outside computer input to create an entry into the watch memory is also provided.

35 Claims, 2 Drawing Sheets

TACTILE ACTUATED ELECTRONIC COMPUTER WRIST WATCH

This Application is a continuation in part of my previous Application for Tactile Actuated Electronic Computer Wrist Watch Ser. No. 09/050,100 filed Mar. 30, 1998, now U.S. Pat. No. 5,878,002, the disclosure of which is incorporated by reference herein.

BACKGROUND AND SUMMARY

The disclosure of my previous application was directed to a six button tactile actuated calculator watch having multiple time and number registers. That tactile actuated calculator watch has the advantage that a user can operate the calculator by tactilely operating the buttons in a certain pattern to create the numbers or functions rather than having to view the watch to create the numbers or functions. The key boards for normal computer watches are normally equipped with twelve keys spaced closely together, in four rows of multiple columns (similar to a telephone keyboard), with one key for each number and one key for each function (add, subtract, multiply, divide, equals, etc.). In these types of watches great care is necessary in order to enter data accurately as it is quite easy to press two buttons or the wrong button because of finger thickness. Quite often one needs to utilize a stylus to actuate the buttons. Further, one has to view the key pad to enter properly.

My previous application utilized six buttons surrounding the watch face to enter data. The instant application utilizes less than six buttons or more than six buttons around the watch periphery for the data entry, relying on combination or multiple pressing of buttons to create the number or function.

Further, the instant invention contemplates an alphabetic entry to the display or memory of the watch. The alphabetic entry can be used for reminder messages, diaries, memos, etc. In addition, the alphabetic inputs can be combined with numerics to create telephone directories similar to those found in cell phones or address lists.

Additionally, the numeric and alpha input could be stored in memories which could be down-loaded into a computer spreadsheet for processing data or down-loaded into a computer word processor for sending letters and E-mails.

The invention contemplates utilizing the same general logic as my previous invention except that five or less buttons are normally utilized. The multiple entries are obtained by multiple pushing of different buttons. Very rapid use of the instant invention is facilitated by memorizing the button combinations for the desired numerical, alphabetic or function entries. While the preferred input is shown utilizing buttons, levers could be used.

Also while the buttons or levers are shown on the edge of the watch, other locations could be used including the face of the watch or the wrist band.

The type of electronics to obtain such operations can be found in U.S. Pat. No. 4,158,285 to Heinsen et al. which type of electronics can be utilized with the instant invention and which electronics is incorporated by reference hereto as an example of the electronics necessary to operate a watch calculator of the above known type. The instant application is not dependent on the electronics to be used, but rather with a logic system that allows tactile input to such electronics.

Other objects, advantages and novel features of the present invention will become apparent from the following detailed description of the invention when considered in conjunction with the accompanying drawings.

DETAILED DESCRIPTION OF A PREFERRED EMBODIMENTS

Figure 1:
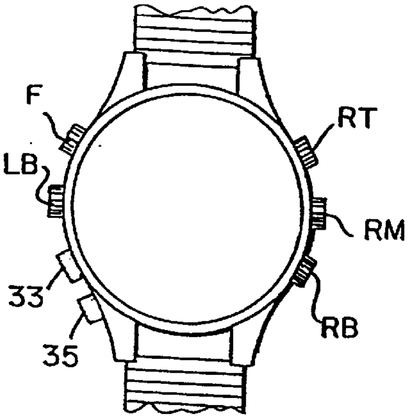
FIG. 1 shows a five button watch incorporating the invention.
Figure 2:
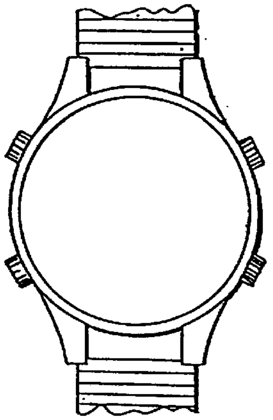
FIG. 2 shows a four button watch incorporating the invention.
Figure 3:
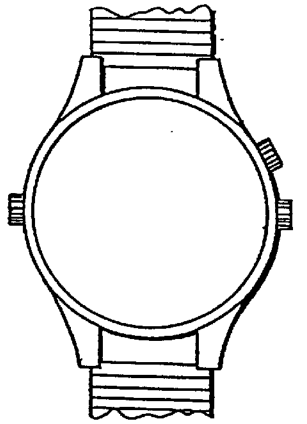
FIG. 3 shows a three button watch incorporating the invention.

A five button watch 1 incorporating the invention is shown in FIG. 1. This watch has a top left button F, a bottom left button LB, a right top button RT, a right middle button RM, and a right lower button RB. While the watch exhibits two buttons on the left and three on the right this could, of course, be reversed with two buttons on the right and three on the left. Likewise one side of the watch could have one button, with four buttons on the other side. The watch 1 is provided with a plurality of Registers 2 to display various information such as times, arithmetic entries, dual times, messages, stop watch, etc. in a manner will known in the art and as described in my previous application. The particular number of registers is not important. In place of register the whole face of the watch can be a LED such as found in cell phones so as to allow for messages to appear over the whole area. Where registers are claimed it should be understood that the term includes such a LED display. While a visual input to read time, mathematical expressions and messages is important, the format therefore is not and therefor can be of any conventional or well known system. An output connector 3 for connection to a computer to download information is provided. An input connection 5 to accept information from a computer is provided.

In the five button species the different functions and numerical inputs can be obtained as follows:

In the five button watch design of this invention, double clicking the F button would create the same effect as the Function button in the six button design in my previous patent the logic of which is illustrated in figures thereof. Triple clicking enters the alphabetic mode. No activity for a while automatically switches to the time mode.

A first suggested program for pushing buttons simultaneously to create numbers and math functions might be:

| | | |
|---|---|---|
| F (double click) | → | switches to calculatormode |
| F and RT | → | creates numeral 1 |
| F and RM | → | creates numeral 2 |
| F and RB | → | creates nurneral 3 |
| LB and RT | → | creates numeral 4 |
| LB and RM | → | creates numeral 5 |
| LB and RB | → | creates numeral 6 |
| F and RT and RM | → | creates numeral 7 |
| F and RM and RB | → | creates numeral 8 |
| LB and RT and RM | → | creates numeral 9 |
| LB and RM and RB | → | creates numeral 0 |
| F and RT (double click) | → | creates math function + |

-continued

| | | |
|---|---|---|
| F and RM (double click) | → | creates math function − |
| F and RB (double click) | → | creates math function × |
| F and RT and RM (double click) | → | creates math function ÷ |
| F and RM and RB (double click) | → | creates math function = |

For example, the calculation 38×24=912 should show the steps:

1. F (double click) toggles device from timekeeping to calculator mode and the display becomes blank,
2. F and RB simultaneously creates a 3 in the unit column of the display,
3. F and RM and RB simultaneously creates an 8 in the unit column and the 3 shifts to the 10's column,
4. F and RB (double click) enters the multiply math function, and the display shows "X" (The +,−,× and % functions should show that function on the display. The =goes right to the answer.),
5. F and RM simultaneously creates a 2 in the units column (the "X" disappears),
6. LB and RT simultaneously creates a 4 in the units column and the 2 shifts to the 10's column,
7. F and RM and RB (double click) initiates the equal, and the correct answer 912 appears in the display, and
8. F (double click) toggles device back to timekeeping mode.

Figure 8:
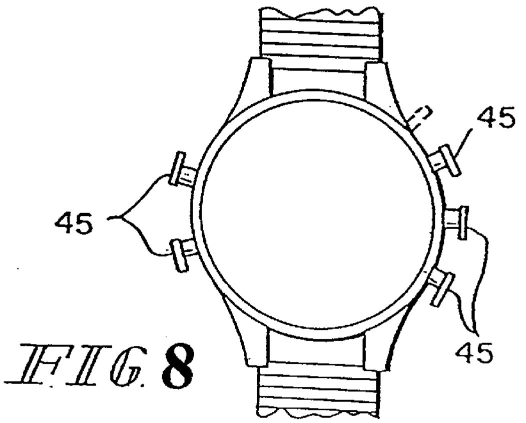
FIG. 8 shows a logic flow chart for the five button watch.
Figure 5:
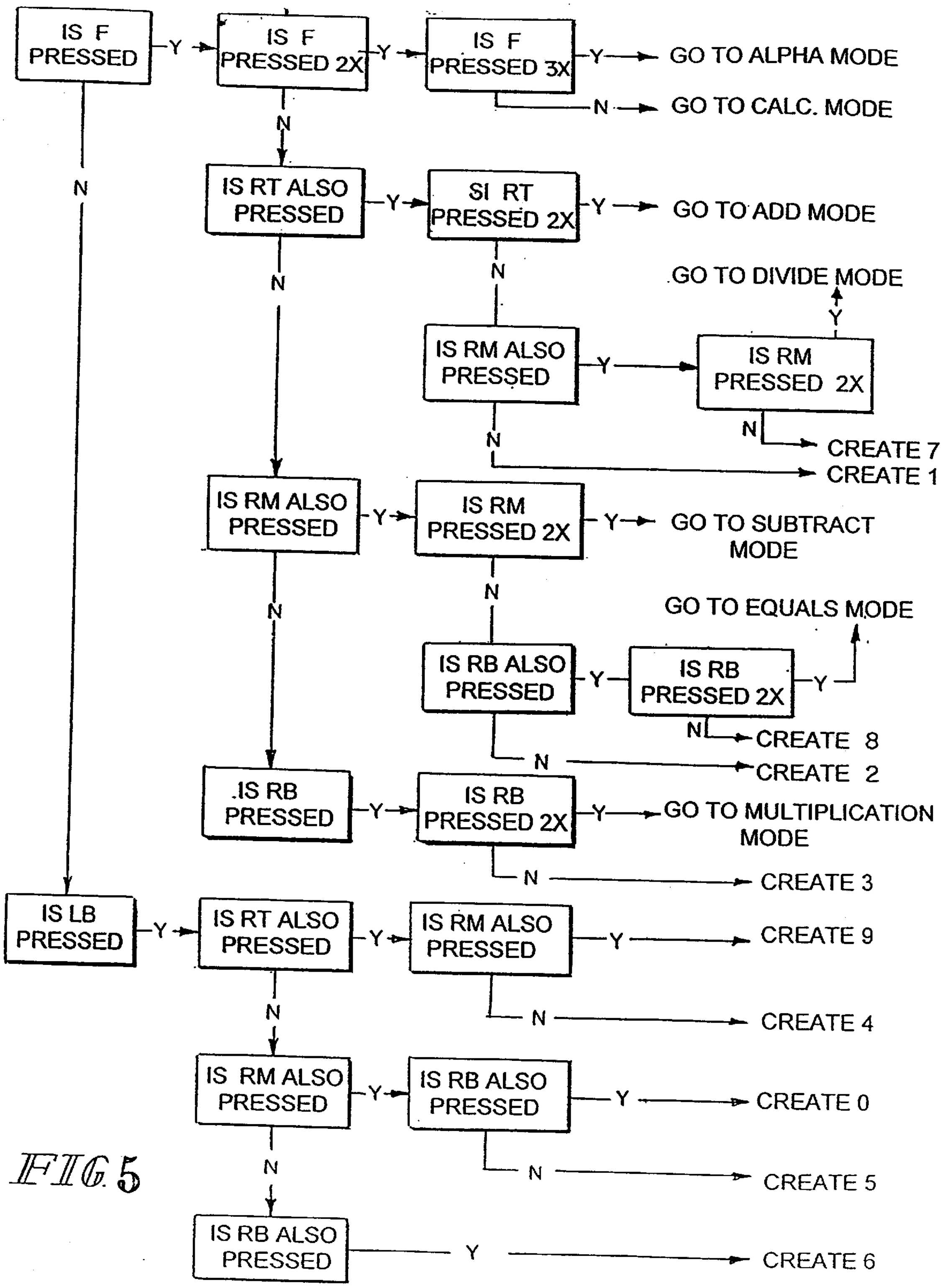
FIG. 5 shows the invention with buttons placed on the face of the watch.

A logic plan for this can be found in FIG. 8.

The alphabetic creations can be obtained by holding down both the F and LB buttons and clicking on the right hand tip button. One click would be an A, two clicks a B, three clicks a C, etc. Punctuation would be holding down the F and LB buttons and multiple clicks on the right hand middle button. E.g. one click for a comma, two clicks a period, 3 clicks an ampersand, etc. To obtain capitals one could also hold down the bottom right hand button while utilizing the above alphabetic combination.

A button code could be provided for storing information in a memory in the watch electronics, e.g. F, RT, RM and RB.

As can be seen from the above five button operation, only one of the left hand buttons need be pressed for each of the inputs. To operate the four button model utilizing the same system as the five button model, one could operate the system using the same number logic except that L button would require pressing of the L button and the LB button would be replaced with a double click pressing of the L button.

An alternative operation could be:

| | | |
|---|---|---|
| L (double click) | → | switches to calculator mode |
| RT | → | creates numeral 1 |
| RM | → | creates numeral 2 |
| RB | → | creates numeral 3 |
| RT and RM | → | creates numeral 4 |
| RT and RB | → | creates numeral 5 |
| RM and RB | → | creates numeral 6 |
| RT and Rm and RB | → | creates numeral 7 |
| RT (double click) and RM | → | creates numeral 8 |
| RT (double click) and RM and RT | → | creates numeral 9 |
| RT (double click) and RM (double click) | → | creates numeral 0 |

Another alternative would be a 3-button or 2-button system. In this system different numbers could be obtained by multiple pressing of the right hand button with the left button held down. For example:

| | |
|---|---|
| L and R (pressed once) to create | 1 |
| L and R (pressed twice) to create | 2 |
| L and R (pressed three times) to create | 3 |
| L and R (pressed four times) to create | 4 |
| L and R (pressed five times) to create | 5 |
| L and R (pressed six times) to create | 6 |
| L and R (pressed seven times) to create | 7 |
| L and R (pressed eight times) to create | 8 |
| L and R (pressed nine times) to create | 9 |
| L and R (pressed ten times) to create | 0 |

The functions could be obtained by multiple pressing of the L button with the right button held e.g.:

| | |
|---|---|
| L (twice) and R creates the math function | + |
| L (three times) and R creates the math function | − |
| L (four times) and R creates the math function | × |
| L (five times) and R creates the math function | ÷ |
| L (six times) and R creates the math function | = |

Under these multiple operations release of the held button signals the end of the input and readies the watch for the next operation.

Also completed entry of a digit of a number could automatically shift to the next digit in the manner done by cell phones, i.e. The entry of the first digit (e.g. 2) and the beginning of the second digit (e.g. 3) automatically shifts the first digit to the tens column, etc. Entry of the third digit (e.g. 5) would shift the first digit to the hundreds column and the second digit to the tens column to produce the number 235.

Figure 4:
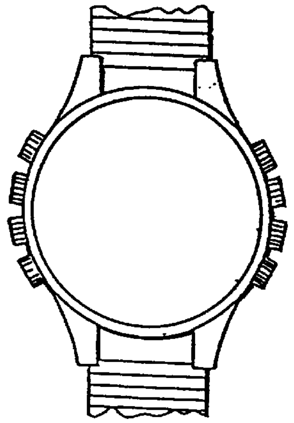
FIG. 4 shows an eight button watch incorporating the invention.

For entry of numbers and letters in the eight button watch of FIG. 4, the following logic could be used.

A suggested program for pushing buttons simultaneously to create numbers, math functions and letters might be:

| | | |
|---|---|---|
| L1 only | → | switches to calculatormode |
| L2 and R1 | → | creates digit 1 |
| L2 and R2 | → | creates digit 2 |
| L2 and R3 | → | creates digit 3 |
| L2 and R4 | → | creates digit 4 |
| L3 and R1 | → | creates digit 5 |
| L3 and R2 | → | creates digit 6 |
| L3 and R3 | → | creates digit 7 |
| L3 and R4 | → | creates digit 8 |
| L4 and R1 | → | creates digit 9 |
| L4 and R2 | → | creates digit 0 |
| L1 and R1 | → | creates math function + |
| L1 and R2 | → | creates math function − |
| L1 and R3 | → | creates math function × |
| L1 and R4 | → | creates math function ÷ |
| L1 and R1 and R4 | → | creates math function = |

(L1 is a "function" button, associated with math functions and time keeping functions. L1 is also associated with typing punctuation. Double clicking L1 switches to alphabetic mode.)

| | | |
|---|---|---|
| L1 Double Click | → | switches to typing mode |
| L2 and R1 and R2 | → | creates letter a |
| L2 and R1 and R3 | → | creates letter b |
| L2 and R1 and R4 | → | creates letter c |
| L2 and R2 and R3 | → | creates letter d |
| L2 and R2 and R4 | → | creates letter e |
| L2 and R3 and R4 | → | creates letter f |
| L3 and R1 and R2 | → | creates letter g |
| L3 and R1 and R3 | → | creates letter h |
| L3 and R1 and R4 | → | creates letter i |
| L3 and R2 and R3 | → | creates letter j |

-continued

| | | |
|---|---|---|
| L3 and R2 and R4 | → | creates ietter k |
| L3 and R3 and R4 | → | creates letter l |
| L4 and R1 and R2 | → | creates letter m |
| L4 and R1 and R3 | → | creates letter n |
| L4 and R1 and R4 | → | creates letter o |
| L4 and R2 and R3 | → | creates letter p |
| L4 and R2 and R4 | → | creates letter q |
| L4 and R3 and R4 | → | creates letter r |
| L1 and L2 and R1 and R2 | → | creates letter s |
| L1 and L2 and R1 and R3 | → | creates letter t |
| L1 and L2 and R1 and R4 | → | creates letter u |
| L1 and L2 and R2 and R3 | → | creates letter v |
| L1 and L2 and R2 and R4 | → | creates letter w |
| L1 and L2 and R3 and R4 | → | creates letter x |
| L2 and R1 and R2 and R3 | → | creates letter y |
| L2 and R2 and R3 and R4 | → | creates letter z |
| (Rapid double clicking the combinations makes capital letters) | | |
| L2 and R1 and R2 and R4 | → | creates symbol ! |
| L2 and R1 and R3 and R4 | → | creates symbol @ |
| L3 and R1 and R2 and R3 | → | creates symbol # |
| L3 and R2 and R3 and R4 | → | creates symbol $ |
| L3 and R1 and R2 and R4 | → | creates symbol % |
| L3 and R1 and R3 and R4 | → | creates symbol ˆ |
| L4 and R1 and R2 and R3 | → | creates symbol & |
| L4 and R2 and R3 and R4 | → | creates symbol * |
| L4 and R1 and R2 and R4 | → | creates symbol ( |
| L4 and R1 and R2 and R4 | → | creates symbol) |
| (Punctuation can use the L1 button) | | |
| L1 and R1 and R2 | → | creates symbol . |
| L1 and R1 and R3 | → | creates symbol , |
| LI and R1 and R4 | → | creates symbol ? |
| L1 and R2 and R3 | → | creates symbol ' |
| L1 and R2 and R4 | → | creates symbol " |
| L1 and R3 and R4 | → | creates symbol ; |
| L1 and R1 and R2 and R3 | → | creates symbol : |
| L1 and R2 and R3 and R4 | → | creates symbol / |
| L1 and R1 and R2 and R4 | → | creates symbol \ |

In a lesser number of button watch one could still obtain letters. For example, with a three button watch, one could use the logic of two buttons, holding the left button down and repeated clicking on the right button for the numerical digits and holding two buttons down and repeated clicking on the third button for letters, i.e.

| | | |
|---|---|---|
| Left and top right (one time) | → | creates a 1 |
| Left and top right (two times) | → | creates a 2 |
| Left and top right (three times) | → | creates a 3 |
| Left and top right (four times) | → | creates a 4 |
| Left and top right (five times) | → | creates a 5 |
| Left and top right (six times) | → | creates a 6 |
| Left and top right (seven times) | → | creates a 7 |
| Left and top right (eight times) | → | creates a 8 |
| Left and top right (nine times) | → | creates a 9 |
| Left and top right (ten times) | → | creates a 0 |
| Letters | | |
| Left and right bottom and right top (one time) | → | creates an A |
| Left and right bottom and right top (two times) | → | creates a B |
| Left and right bottom and right top (three times) | → | creates a C |
| Left and right bottom and right top (four times) | → | creates a D |
| Left and right bottom and right top (five times) | → | creates an E |
| Left and right bottom and right top (six times) | → | creates a F |
| Left and right bottom and right top (seven times) | → | creates a G |
| Left and right bottom and right top (eight times) | → | creates a H |
| Left and right bottom and right top (nine times) | → | creates an I |
| Left and right bottom and right top (ten times) | → | creates a J |
| Left and right bottom and right top (11 times) | → | creates a K |
| Left and right bottom and right top (12 times) | → | creates a L |
| Left and right bottom and right top (13 times) | → | creates a M |
| Left and right bottom and right top (14 times) | → | creates a N |
| Left and right bottom and right top (15 times) | → | creates an O |
| Left and right bottom and right top (16 times) | → | creates a P |
| Left and right bottom and right top (17 times) | → | creates a Q |
| Left and right bottom and right top (18 times) | → | creates a R |
| Left and right bottom and right top (19 times) | → | creates a S |

-continued

| | | |
|---|---|---|
| Left and right bottom and right top (20 times) | → | creates a T |
| Left and right bottom and right top (21 times) | → | creates an U |
| Left and right bottom and right top (22 times) | → | creates a V |
| Left and right bottom and right top (23 times) | → | creates a W |
| Left and right bottom and right top (24 times) | → | creates a X |
| Left and right bottom and right top (25 times) | → | creates a Y |
| Left and right bottom and right top (26 times) | → | creates a Z |

Thus the invention contemplates the ability to generate a calculator watch that has a memory for holding alphabetic and alphabetic-numeral combinations and admits of tactile operation for mathematic and alphabetic operations without having a single key for each operation.

The outlet port allows information stored in a memory (ies) of the watch electronics to be downloaded to a computer where the information could be stored for further use or sent as E-mail. For example, a traveling salesman could put orders, telephone numbers, birthdays, etc. into a memory in the watch and download them to a computer later.

The input watch could provide for creating a phone directory, a travel itinerary, meeting schedules, etc. To access the input or output additional button combinations would be used.

As noted above the particular button combinations used to create the numbers, letters and functions is not important, what is important is the tactile input concept.

Figure 6:
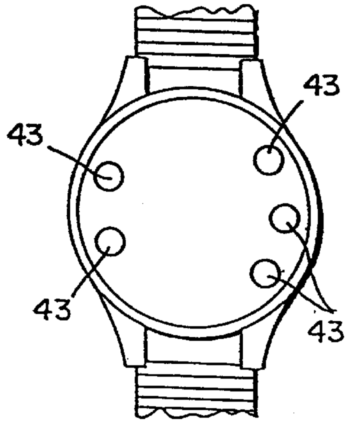
FIG. 6 shows the invention with buttons placed on the watch strip.
Figure 7:
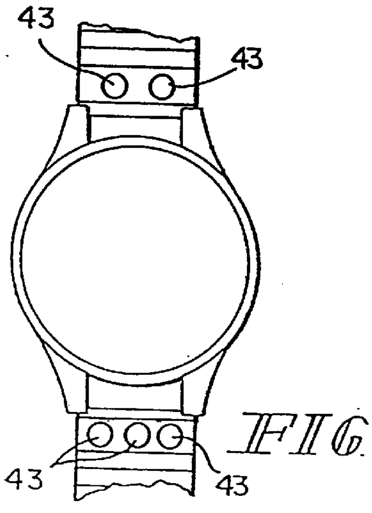
FIG. 7 shows the use of retractable levers for input.

As shown in FIGS. 6 and 7 the location of the push buttons 13 could be other than on the edge of the watch. Likewise levers 15 that normally are recessed into the face of the watch, but which can be spring released (i.e., pressing inwardly unlocks the lever so it extends outwardly as shown in phantom) could be used. Further a combination of levers and buttons, or locations therefore, is within the scope of the invention.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A tactilely setable data input structure for a battery-operated, computer-run wristwatch operable in a time mode and a calculator mode comprising:

a watch casing housing battery and clock calculator electronics and at least one visible display having multiple units therein;

a plurality of buttons connected to the electronics, which buttons are located on the watch casing for operating the electronics to cause the visible display to shift between a calculator and a time display upon selective depression of at least one of said plurality of buttons;

depression of at least two of said plurality of buttons connected to said electronics creates some of the digits zero through nine or no digit in a first unit of the display dependent on the combination of specific buttons simultaneously pressed;

wherein release of the buttons creating the digit allows for shifting of the digit in the first unit of the display to an adjoining unit of the display for creation of another digit in the first unit of the display;

wherein depressing of different button combinations from those creating the digits zero to nine, activates the calculator electronics to any one of the mathematical functions of adding, subtracting, dividing or multiplying digits previously entered into the display by a subsequent sequence of digits to be entered into the display;

wherein pressing of still another combination of buttons creates an equal function, so that upon release of this still another combination of buttons causes the display to show the mathematical result of the function selected.

2. The tactile input structure of claim 1, wherein a first button of the plurality of buttons is depressed simultaneously with at least a second one of the plurality buttons to initiate an add, subtract, multiply, divide or equals mathematical function for the electronics.

3. The tactile input structure of claim 2, wherein alphabetic letters are created in the visible display caused by selective simultaneous depressing of at least two of the plurality of buttons.

4. The tactile input of claim 3, wherein each of the number digits and letters created requires depressing of the first button of the plurality of buttons simultaneously with a second button of the plurality and wherein the second button is repeatedly depressed while maintaining the first button depressed to create the different numbers zero through nine and the different letters A through Z.

5. The tactile input structure of claim 1, wherein alphabetic letters are created in the visible display caused by selective simultaneous depressing of at least two of the plurality of buttons.

6. The tactile input of claim 5, wherein each of the number digits and letters created requires depressing of the first button of the plurality of buttons simultaneously with a second button of the plurality and wherein the second button is repeatedly depressed while maintaining the first button depressed to create the different numbers zero through nine and the different letters A through Z.

7. The tactile input of claim 1, wherein each of the number digits created requires depressing of the first button of the plurality of buttons simultaneously with a second button of the plurality and wherein the second button is repeatedly depressed while maintaining the first button depressed to create the different numbers zero through nine.

8. The tactile input of claim 2, wherein each the number digits created requires depressing of the first button of the plurality of buttons simultaneously with a second button of the plurality and wherein the second button is repeatedly depressed while maintaining the first button depressed to create the different numbers zero through nine.

9. The tactile input of claim 1, wherein the plurality of buttons encompasses at least three buttons.

10. The tactile input of claim 2, wherein the plurality of buttons encompasses at least three buttons.

11. The tactile input of claim 3, wherein the plurality of buttons encompasses at least three buttons.

12. The tactile input of claim 4, wherein the plurality of buttons encompasses at least three buttons.

13. The tactile input of claim 1, wherein the plurality of buttons encompasses at least five buttons.

14. The tactile input of claim 2, wherein the plurality of buttons encompasses at least five buttons.

15. The tactile input of claim 3, wherein the plurality of buttons encompasses at least five buttons.

16. The tactile input of claim 4, wherein the plurality of buttons encompasses at least five buttons.

17. The tactile input of claim 1, wherein the plurality of buttons encompasses at least seven buttons.

18. The tactile input of claim 2, wherein the plurality of buttons encompasses at least seven buttons.

19. The tactile input of claim 3, wherein the plurality of buttons encompasses at least seven buttons.

20. The tactile input of claim 4, wherein the plurality of buttons encompasses at least seven buttons.

21. The tactile input of claim 3, wherein at least one of an input and output port is provided to the electronics for transferring data between the watch and an external computer.

22. The tactile input of claim 4, wherein at least one of an input and output port is provided to the electronics for transferring data between the watch and an external computer.

23. The tactile input of claim 5, wherein at least one of an input and output port is provided to the electronics for transferring data between the watch and an external computer.

24. The tactile input of claim 6, wherein at least one of an input and output port is provided to the electronics for transferring data between the watch and an external computer.

25. The tactile input of claim 7, wherein at least one of an input and output port is provided to the electronics for transferring data between the watch and an external computer.

26. The tactile input of claim 8, wherein at least one of an input and output port is provided to the electronics for transferring data between the watch and an external computer.

27. The tactile input of claim 1, wherein the buttons are located on the edge of the watch casing.

28. The tactile input of claim 1, wherein the buttons are located on the face portion of the watch casing.

29. The tactile watch of claim 1, wherein the watch has a wrist band and the buttons are located on the wrist band.

30. The tactile input of claim 1, wherein the watch has a wrist band and the buttons are located on at least two of the positions of: edge of the watch casing, face casing, or watch wrist band.

31. A tactilely setable data input structure for a battery-operated, computer-run wristwatch operable in a time mode and a calculator mode comprising:

a watch casing housing battery and clock calculator electronics and at least one visible display having multiple units therein;

a plurality of levers connected to the electronics, which levers are located on the watch casing for operating the electronics to cause the visible display to shift between a calculator and a time display upon selective depression of at least one of said plurality of levers;

depression of at least two of said plurality of levers connected to said electronics creates some of the digits zero through nine or no digit in a first unit of the display dependent on the combination of specific levers simultaneously pressed;

wherein release of the levers creating the digit shifts the register to an adjoining unit of the display for creation of a digit in a second unit of the display;

wherein depressing of different lever combinations from those creating the digits zero to nine, activates the calculator electronics to any one of the mathematical functions of adding, subtracting, dividing or multiplying digits previously entered into the display by a subsequent sequence of digits to be entered into the display;

wherein release of these different lever combinations initially clears the display to allow for insertion of the new number; and wherein pressing of still another combination of levers creates an equal function, so that upon release of this still another combination of levers causes the display to show the mathematical result of the function selected.

32. The tactile input of claim 31, wherein the levers are located on the edge of the watch casing.

33. The tactile input of claim 31, wherein the levers are loated on the face portion of the watch casing.

34. The tactile watch of claim 31, wherein the watch has a wrist band and the levers are located on the wrist band.

35. The tactile input of claim 31, wherein the watch has a wrist band and the levers are located on at least two of the positions of: edge of the watch casing, face casing, or watch wrist band.

* * * * *